United States Patent [19]
Talarico

[11] 4,191,003
[45] Mar. 4, 1980

[54] TRAY LOADER

[76] Inventor: Lawrence J. Talarico, 50 Sydney Ave., Deal, N.J. 07723

[21] Appl. No.: 897,576

[22] Filed: Apr. 19, 1978

[51] Int. Cl.² .......................... B65B 5/08; B65B 5/06
[52] U.S. Cl. ......................................... 53/247; 53/539
[58] Field of Search ................. 53/495, 537, 539, 543, 53/247; 198/488

[56] References Cited
U.S. PATENT DOCUMENTS

| | | | |
|---|---|---|---|
| 2,712,405 | 7/1955 | Rockcastle | 53/539 |
| 2,834,167 | 5/1958 | Loveridge | 53/539 X |
| 3,119,213 | 1/1964 | Kinney | 53/537 X |
| 3,185,328 | 5/1965 | Dardaine et al. | 53/539 X |
| 3,783,587 | 1/1974 | Kurtenbach | 53/247 |

FOREIGN PATENT DOCUMENTS
397432  11/1974  U.S.S.R. .................................. 198/488

*Primary Examiner*—Horace M. Culver
*Attorney, Agent, or Firm*—Kane, Dalsimer, Kane, Sullivan and Kurucz

[57] ABSTRACT

This disclosure is of apparatus which picks up a plurality of tapered cups containing any of a variety of products, such cups being closed with lids or heat sealing, moves such cups as a unit in a vertical lift, and then deposits such cups as a unit in a vertical discharge into a tray.

5 Claims, 9 Drawing Figures

4,191,003

TRAY LOADER

BACKGROUND OF THE INVENTION

1. Field of the Invention

The invention relates to loading apparatus and more particularly to a tray loader for discharging a plurality of closed tapered cups containing a product into a tray.

2. Brief Description of the Prior Art

There are on the market a variety of tray loaders most of which raise a receptacle to a unit of alined cups. Others deposit cups through a chute into pockets in a tray. All have the same disadvantage of operating at relatively slow speeds in loading such cups into trays.

The apparatus of the present invention operates at high speed, functions in a manner which avoids shock and vibration, and overcomes the disadvantages of the apparatus now in use.

SUMMARY OF THE INVENTION

The invention comprises a tray loader which comprises means for conveying a plurality of spaced carriages provided with forks around the sides of a rectangular path;

means for conveying a plurality of tapered lidded cups spaced in rows and across into the path of the forks of an empty carriage;

means for vertically lifting said empty carriage when a unit of said cups are positioned in the forks, which lifting causes the forks to contact the bodies of the said cups and lift the said unit of cups;

conveying the loaded carriage around three sides of the rectangular path, vertically discharging the unit of cups into a receptacle, and moving the carriage away from the loaded receptacle to the initial starting position to pick up another unit of cups;

the said carriages being conveyed at all times with the forks in a horizontal position; and means for removing the loaded receptacle away from the point of discharge of the cups into the receptacle.

DETAILED DESCRIPTION OF THE PREFERRED EMBODIMENTS OF THE INVENTION

The tray loader of the present invention is adapted to pick up a plurality of tapered cups, for example one dozen aligned in an arrangement or unit of four rows three across. A variety of products can be packaged in such cups, for example cottage cheese, yogurt, cheeses, cheese spreads, portion packs of fruit juices, etc. Such cups are closed with lids, heat sealing or other means. The unit of cups is discharged into a receptacle such as a tray or box with a bottom, with or without spaced cut outs in the top of the receptacle. Although the cups illustrated herein are tapered from top to bottom, it will be understood that "tapered" also applies to cups having any form of taper permitting the forks to pick up the cups, for example at the top of the cups.

Figure 5:
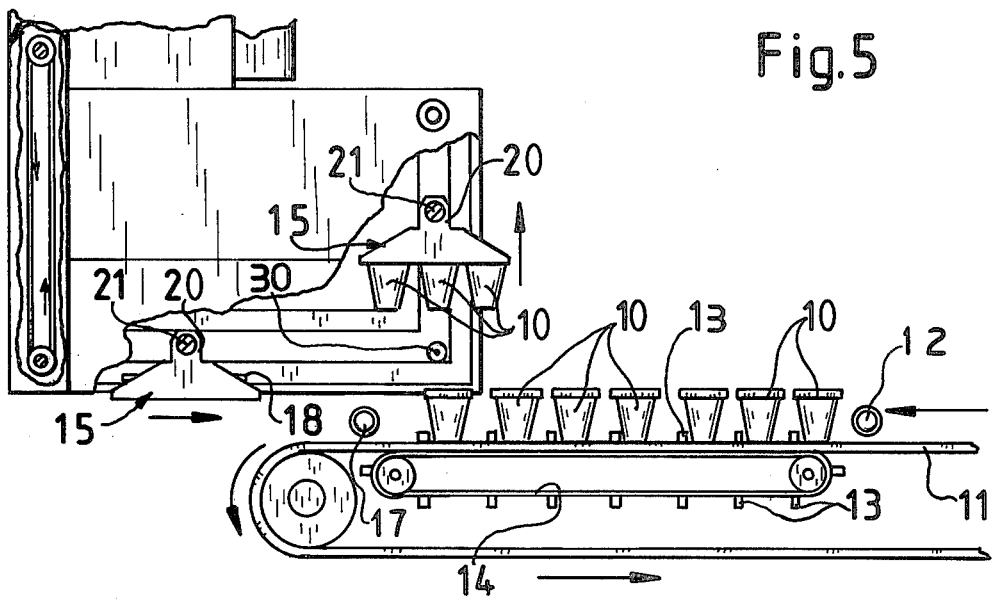
FIG. 5 is a side plan view showing the conveyor for feeding the cups to the tray loader, a carriage with a unit of cups in a vertical lift, and an empty carriage ready to pick up a unit of cups.

The cups 10 are brought in filled and closed condition from a filling machine or other station on a filler conveyor in spaced rows with the cups aligned across the conveyor. From the filler conveyor the cups enter the infeed and collator section A where the cups are fed onto a first machine conveyor 11 (FIG. 5). The lines of cups four across feed along this first machine conveyor until they hit a switch or electric eye 12, which indexes flight fingers 13 on a second machine conveyor 14 built within the first machine conveyor to positions between the cups. Such fingers align the cups into a predetermined relationship by contacting the leading edge of each cup on the first machine conveyor. Thus the cups as they proceed along such conveyor to the carriage pickup of the tray loader are equally spaced in each row and are aligned in a cross direction.

Figure 1:
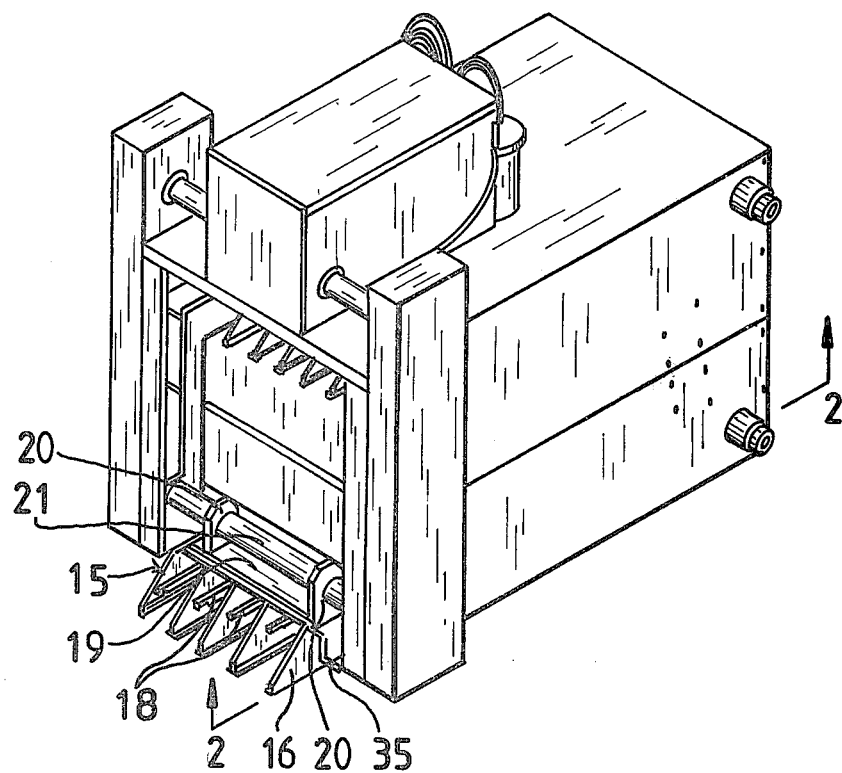
FIG. 1 is an isometric view of the tray loader of the present invention showing the discharge end.
Figure 4:
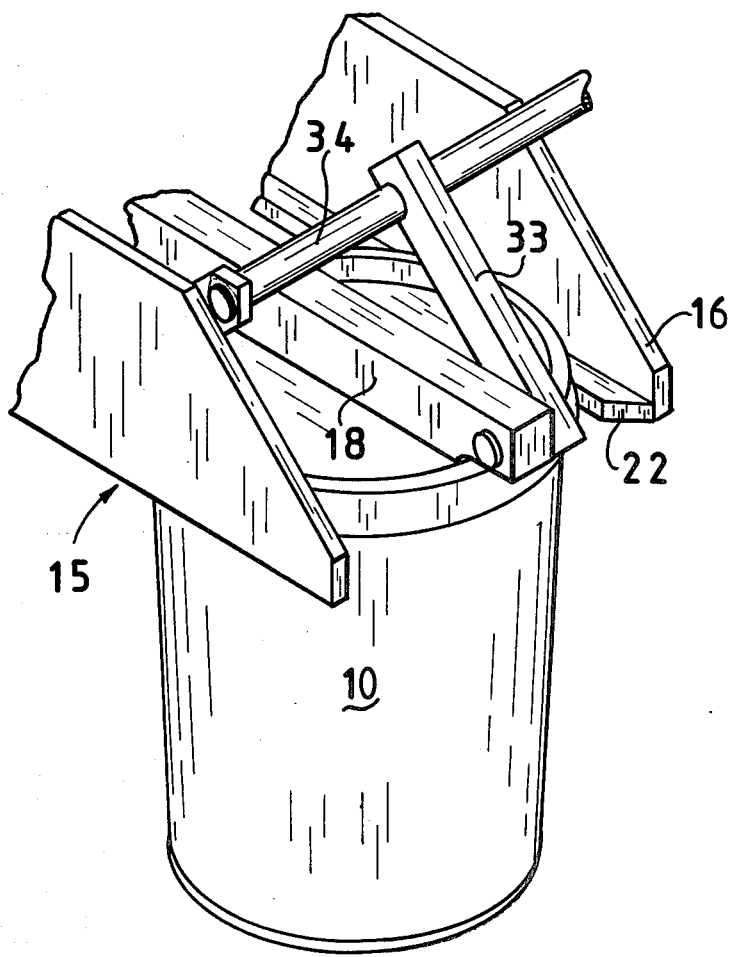
FIG. 4 is an isometric view of a pair of the forks on the carriage contacting the body of a cup with the hold down bar bearing down on the lid of the cup.

A carriage pickup 15 is in position at the end of the first machine conveyor so that the moving cups will enter between the L-shaped forks 16 of the carriage, with a pair of forks for each row of cups (FIGS. 1 and 4). Because of the spacing of the forks and the taper of the cups, the forks at this point do not touch the bodies of the cups. When the forks of the carriage are filled with three rows of cups four abreast a switch 17 activates the transport section B. The carriage containing the cups now rises vertically causing the forks to contact the bodies of the cups below the lids. Simultaneously the hold down bars 18 are activated and move downwardly against the tops of the lidded cups. The hold down bar can be contoured to fit within the outer perimeters of the lids to further hold the cups in a fixed position.

Figure 2:
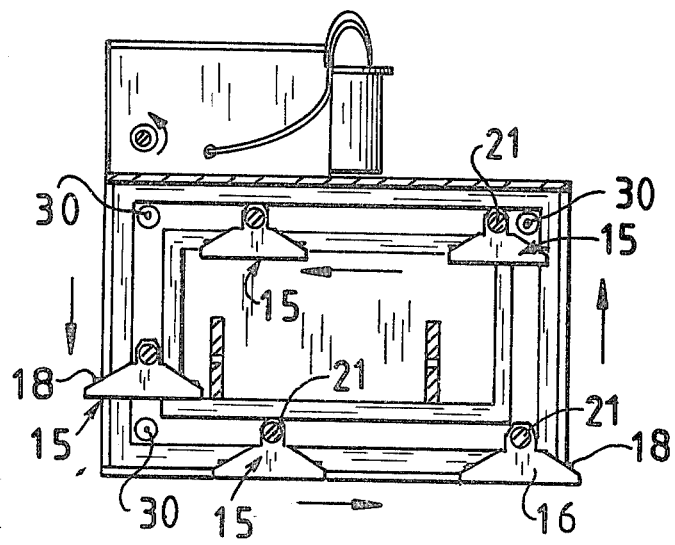
FIG. 2 is a side view partly in section showing the five carriages and the chain for carrying such carriages in the path of a rectangle.
Figure 3:
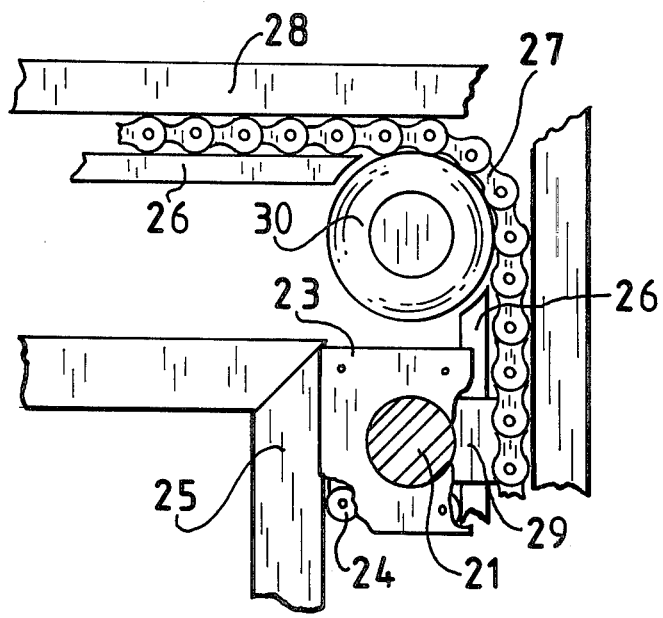
FIG. 3 is a side view showing one corner of the chain of FIG. 2 and the means for mounting a carriage on the chain.

The carriage pickup 15 (FIG. 1) comprises the L-shaped forks 16, a frame 19 extending across the machine to support the forks, a pair of brackets 20 affixed to the frame 19, and a shaft 21 carrying the brackets and maintaining the forks in a fixed horizontal position at all times. The edges of the forks 16 preferably have serrations 22 to aid in holding the cups and preventing them from sliding along the forks (FIG. 4). Each end of the shaft 21 is mounted in a block 23 (FIG. 3) with a roller 24 in each corner of the block. The rollers 24 permit the block to move along spaced roller guides 25 and 26 secured to the frame of the transport section B. The guides 25 and 26 extend completely around the transfer section B in the form of rectangle (FIG. 2). Thus the blocks permit the carriage to move within such guides in a rectangular path to provide a vertical lift and vertical discharge for the carriage with the forks of the carriage constantly maintained in a horizontal position. It will be further noted that the blocks 23 move into and out of each corner of the rectangular path squarely without following any curved path. The carriage is moved around such path by means of a sprocket chain 27 which follows a path between the roller guide 26 and an outer guide 28. A crank 29 is fixedly secured to the sprocket chain 27 and rotatably mounted on the shaft 21. It will be apparent from FIG. 3 that the crank will move in a curved path around a corner of the rectangle while the block will make a square corner. The sprocket chain 27 moves around the corners over sprocket wheels 30, but between the wheels is guided between the roller guides 26 and the outer guides 28.

As illustrated (FIG. 2) there are five carriages, similar to the carriage 15 heretofore described, mounted on the sprocket chain 27 at spaced intervals. The carriages are so positioned and the size of the path so determined that only one carriage is moving around one corner at any time. This avoids shock and vibration which is important when some products such as yogurt, should be subjected to as little shock and vibration as possible. The sprocket chain is driven by a motor (not shown) which drives one of the corner sprocket wheels 30 by means of a pulley 31 and belt 32 (FIG. 5).

Figure 7:
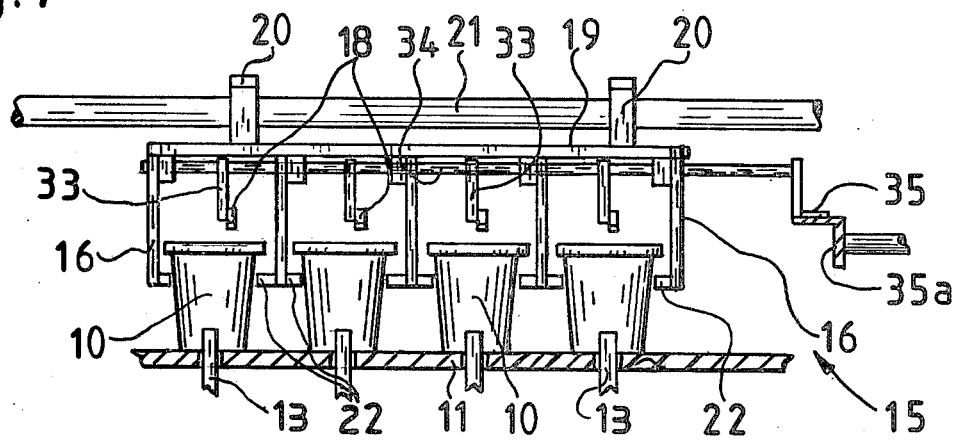
FIG. 7 is a sectional view showing the position of the forks immediately before pick-up.
Figure 8:
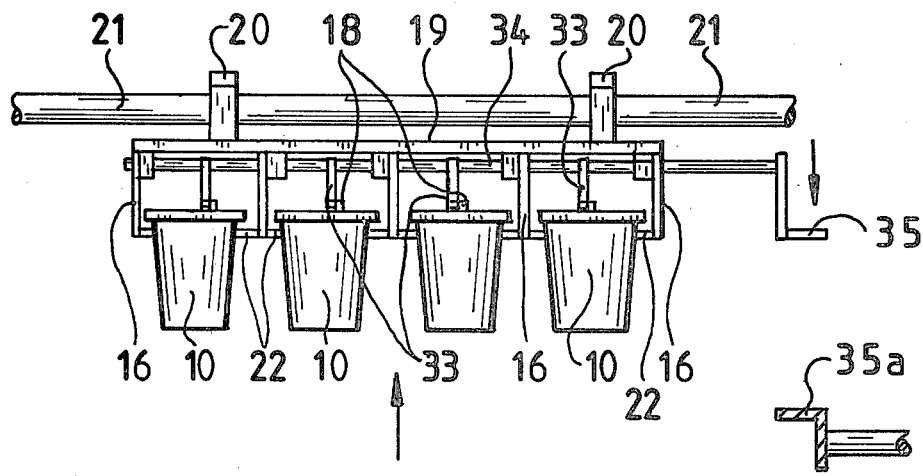
FIG. 8 is a sectional view similar to FIG. 7 showing the position of the forks immediately after pick-up.

Further describing the carriage (FIGS. 1 and 4) the hold down bars 18 extend the length of the forks so that they will simultaneously come down on the lids of three cups at a time. Such bars are preferably contoured to fit within the perimeters of the lids. There are bars 33 which are rotatably mounted on the hold down bar 18 which bars 33 are affixed to a shaft 34 extending across the four pair of forks. At the outside end of such shaft is a trip 35, which trip will rotate the shaft 34 and thus raise or lower the hold down bar. During the period from the time a carriage discharges cups until the time such carriage picks up cups the trip 35 comes into contact with a bar 35a running between the discharge section C and the infeed section A (FIGS. 7 and 8). Such bar keeps the hold down bar in an up position off the lids of the cups.

Figure 6:
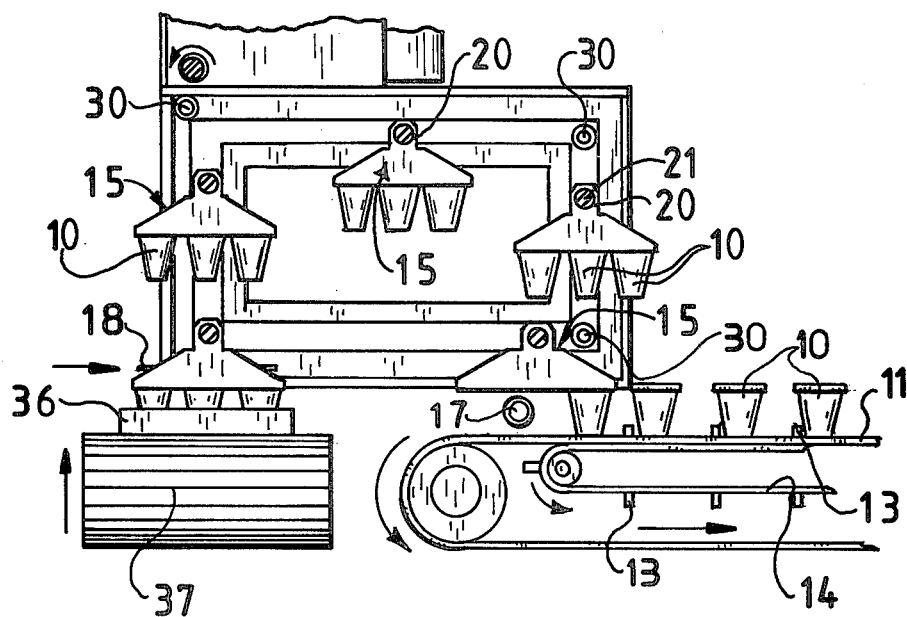
FIG. 6 is a side plan view showing the path of the five carriages, with a carriage approaching the cups on the infeed conveyor, and a unit of cups being discharged onto the tray on the discharge conveyor.
Figure 9:
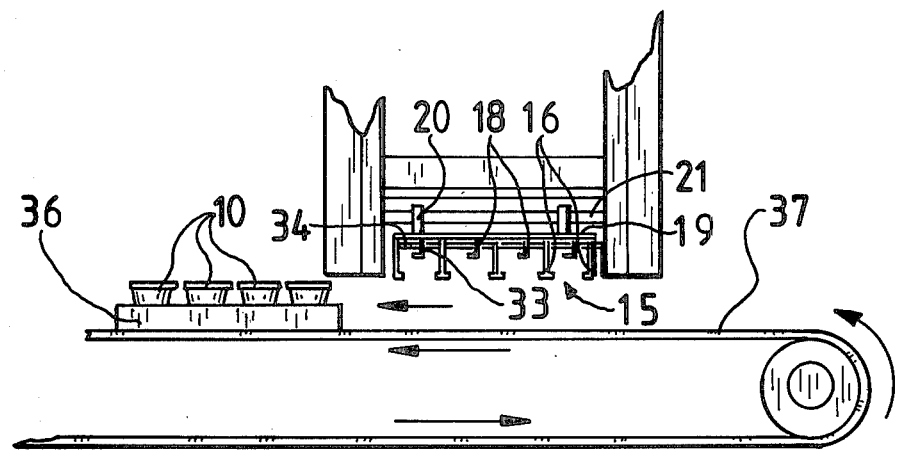
FIG. 9 is an end view of the discharge end of the tray loader and the discharge conveyor carrying a tray of cups from the loader.

The loaded carriage which picked up the unit of cups moves upward to its next stopping position while the next carriage which has discharged its unit of cups moves into position at the end of the conveyor 11 ready to receive the next unit of cups at the end of the conveyor. FIG. 6 shows the various positions of the five carriages around the rectangular path. One carriage has just discharged its cups at the discharge section C, the next three carriages are loaded with units of cups going through the transfer section B, and the fifth carriage is just picking up a unit of cups at the infeed section A. As each loaded carriage completes its trip around the three sides of the rectangle it discharges its load at the discharge section. At this point the desired receptacle 36, which can be a tray, box or similar container, is in position below the arriving loaded carriage. Such receptacle is horizontally positioned on a stop-start conveyor 37 so that the loaded carriage, making a vertical discharge, places the cups in position on the bottom of the receptacle. As the carriage moves downwardly the forks will be released downwardly and disengage from the bodies of the cups. The forks will thus permit the carriage to move horizontally along the bottom leg of the rectangle to the next station without moving the cups in the receptacle 36 since there is no longer any physical contact. The empty carriage continues along such bottom leg of the rectangle to the infeed section A to pick up a unit of cups as heretofore described. The conveyor 37 moves the receptacle loaded with cups out of the way, either as shown in FIG. 9 or at a right angle, and an empty receptacle moves into position to receive the next unit of cups from the carriage.

Although the tray loader has been described as picking up a unit of a dozen cups, it will be understood that such number can be varied according to requirements. Furthermore, the alignment of four rows three abreast can likewise be modified by changing the machine conveyor and the forks of the carriage. Likewise the number of carriages can be changed to more or less than the five illustrated and described. It will be apparent from the foregoing description that the carriages always maintain the cups held by the forks in a horizontal position from the time such cups are picked up in a vertical lift until they are deposited on the receptacle in a vertical discharge.

Those skilled in the art will appreciate that many variations of the above described embodiment of the invention may be made without departing from the spirit and the scope of the invention.

I claim:

1. Apparatus for loading as a unit a plurality of tapered lidded cups containing any of a variety of products into a receptacle comprising:

means for feeding said cups spaced in rows and across into the path of a carriage provided with forks aligned with said rows of cups with a pair of forks for each row of cups, each pair of forks being in fixed parallel relationship with the spacing between such pair of forks being less than the diameters of the tops of the bodies of the cups and greater than the diameters of the bottoms of the cups to permit the cups to be initially fed into the path of the carriage without the forks touching the bodies of the cups;

conveying means to which the carriage is affixed, which conveying means travels in one direction around the four sides of a generally rectangular path and (a) vertically lifts said carriage when said unit of cups is positioned in the forks and moves the carriage and unit of cups upwardly along the one end of the rectangular path, said lifting causing the forks to contact the bodies of said cups and lift said unit of cups;

(b) moves the carriage and unit of cups along the horizontal top leg of the rectangular path;

(c) moves the carriage and unit of cups downwardly along the opposite end of the rectangular path and deposits the said unit of cups in a vertical discharge onto a receptacle positioned below the descending carriage, the said descent releasing the forks from the bodies of the cups; and (d) then moves the empty carriage along the horizontal bottom leg of the rectangular path away from the loaded receptacle to the initial starting position to pick up another unit of cups;

the said carriage being conveyed at all times with the forks in a horizontal position; and means for removing the loaded receptacle away from the point of discharge of the cups into the receptacle.

2. The apparatus of claim 1 wherein a plurality of said carriages are affixed to the said conveying means.

3. The apparatus of claim 2 wherein the carriages are spaced on the conveying means so that no more than one carriage will be turning a corner at the same time thereby avoiding shock and vibration in the apparatus or the product being conveyed.

4. The apparatus of claim 1 wherein the carriage is provided with hold down bars positioned between the forks which bars move downwardly on the lids of the cups when the unit of cups is picked up by the forks and upwardly from the lids of the cups when the unit of cups is discharged from the forks.

5. The apparatus of claim 1 which comprises:

frame members extending around the rectangular path of the conveying means and spaced to permit the carriage to move between the said members;

a shaft extending across the spaced frame members, each end of the shaft being mounted in a block, each said block being adapted to move along guides secured to the adjacent frame member;

a sprocket chain pivotally affixed to each block with means to convey the said chain around the rectangular path with the block moving squarely into each corner of the rectangular path without rotating;

the carriage being affixed to the said shaft;

whereby the forks of the carriage will be constantly maintained in a horizontal position.

* * * * *